(No Model.)
J. H. STUBBE.
VEHICLE BRAKE.
No. 550,659. Patented Dec. 3, 1895.
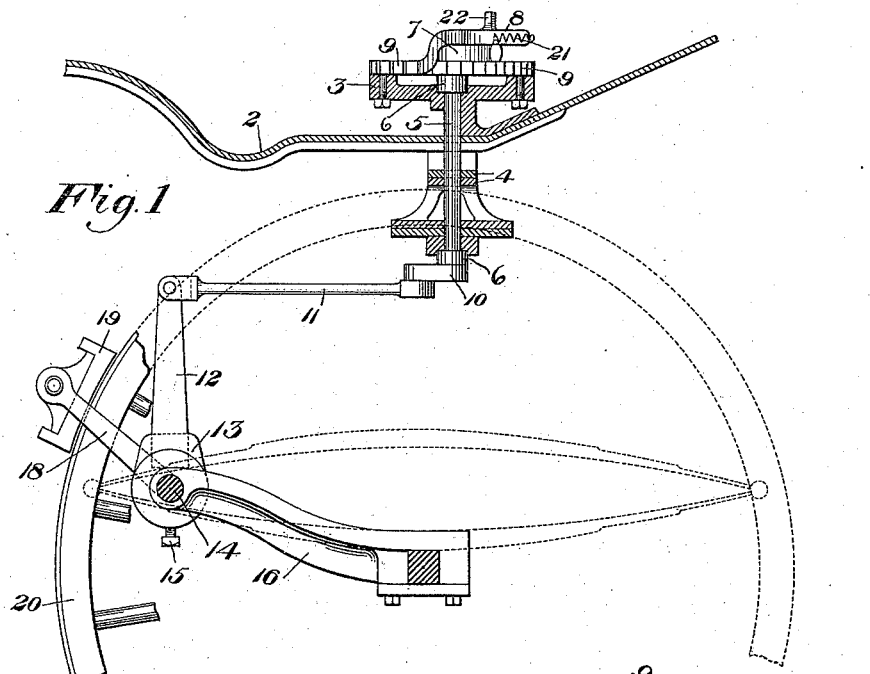
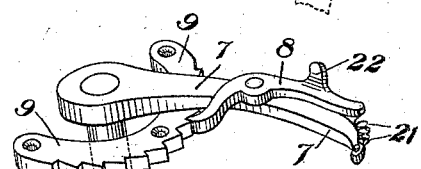
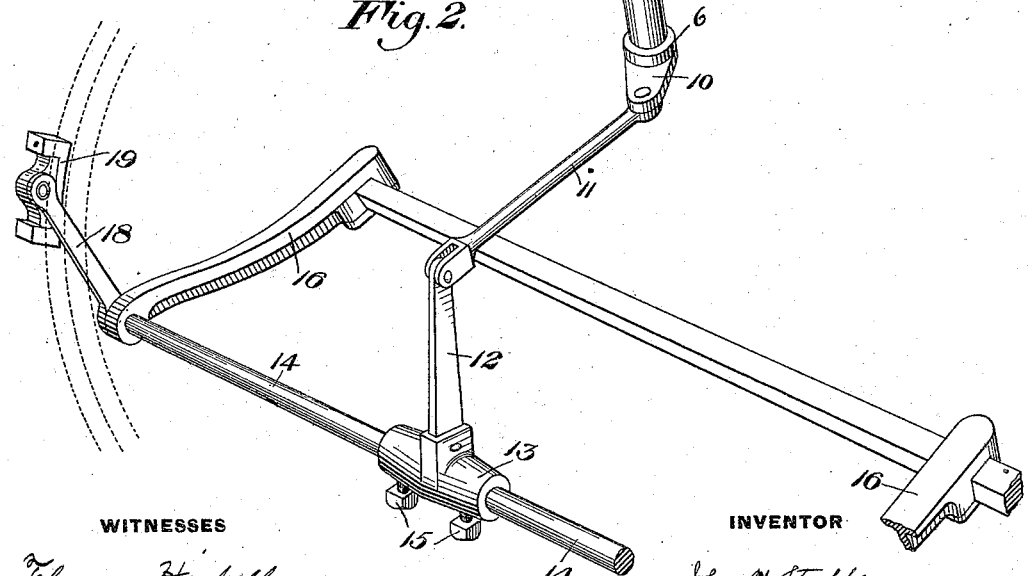
WITNESSES
Florence Haspell
George Flemming
INVENTOR
John H. Stubbe
by James K. Bakewell
his Attorney

UNITED STATES PATENT OFFICE.

JOHN H. STUBBE, OF PITTSBURG, PENNSYLVANIA.

VEHICLE-BRAKE.

SPECIFICATION forming part of Letters Patent No. 550,659, dated December 3, 1895.

Application filed August 26, 1895. Serial No. 560,471. (No model.)

*To all whom it may concern:*

Be it known that I, JOHN H. STUBBE, of Pittsburg, in the county of Allegheny and State of Pennsylvania, have invented a new and useful Improvement in Vehicle-Brakes, of which the following is a full, clear, and exact description, reference being had to the accompanying drawings, forming part of this specification, in which—

Figure 1 is a side elevation, partially in section, showing my improved brake as applied to the axle of a cab; and Fig. 2 is a perspective view of the brake.

Like numerals of reference indicate like parts wherever they occur.

My invention relates to brakes to be applied to vehicles; and it consists in the combination and arrangement of parts, as is hereinafter described, whereby a durable and effective brake is provided.

I will now describe my invention, so that others skilled in the art may manufacture and use the same.

In the drawings, 2 represents the foot-board of a cab to which is secured the supporting-brackets 3 and the fifth-wheel 4, in which is journaled the king-bolt 5, at each end of which king-bolt is a collar 6. Keyed to the top of the king-bolt 5 is the foot-lever 7, having a dog 8 pivoted thereon, which dog is adapted to engage with the toothed rack 9, which is bolted to the bracket 3. Keyed to the lower end of the king-bolt 5 is a crank-arm 10, to the outer end of which is pivoted the horizontal lever-rod 11, the outer end of which is pivoted to the vertical lever-arm 12, which extends from and is fixed to the sleeve 13, which sleeve is fitted on the transverse rod 14 and is adjustably secured thereto by the screw-bolts 15. This rod or shaft 14 is journaled in the supporting-arms 16, which extend from and are secured to the axle 17. At one end of the rod 14 is keyed the brake-arm 18, at the end of which is the brake-shoe 19.

The operation is as follows: When it is desired to apply the brake, the driver, by placing his foot against the foot-lever 7 and pressing it forward, causes the king-bolt 5 to turn on its axis, and thereby drawing the lever-arms 11 and 12 forward, causes the rod 14 to turn on its axis and press the brake-shoe 19 against the tire of the wheel 20. As the foot 7 is pushed forward the dog 8 passes over the inclined faces of the teeth of the rack 9 and engages with one of the teeth at the end of the movement under the force of the spring 21. On top of the dog 8 is a lug 22, which enables the dog to be pressed back by the foot of the driver, so as to release the dog and the brake.

The advantages of my improvement will be evident to those skilled in the art. The brake is effective and easily applied. It is strong and durable and there is no lost motion. When the brake-shoe wears down, the sleeve 13 may be adjusted on the rod 14 to compensate therefor by loosening the bolts, turning the sleeve slightly on the rod 14, and then tightening the bolts. This sleeve may be made in two parts, so that the brakes may be adjusted separately.

Having thus described my invention, what I claim, and desire to secure by Letters Patent, is—

1. In a vehicle brake, the combination of a king bolt, an operating lever and a crank fixed thereto, a brake shaft journaled in arms extending from the axle, and levers connecting the brake shaft and the king bolt crank; substantially as and for the purpose specified.

2. In a vehicle brake, the combination of a king bolt having a foot lever and a crank, a rack adjacent to the foot lever, a dog pivoted to the lever and having a lug extending therefrom, a brake shaft, and levers connecting the brake shaft and the king bolt crank; substantially as and for the purpose specified.

In testimony whereof I have hereunto set my hand.

JNO. H. STUBBE.

Witnesses:
JAMES K. BAKEWELL,
FLORENCE E. HARPELL.